Aug. 23, 1938.  G. M. EVANS  2,127,591

SHAFT SEAL

Filed May 27, 1936

INVENTOR.
Gordon M. Evans
BY
Barnes, Kisselle, Laughlin & Raisch
ATTORNEY.

Patented Aug. 23, 1938

2,127,591

UNITED STATES PATENT OFFICE 2,127,591

SHAFT SEAL

Gordon M. Evans, Dearborn, Mich.

Application May 27, 1936, Serial No. 81,987

7 Claims. (Cl. 286—11)

This invention relates to a seal structure for sealing a joint where, for example, a rotating shaft is journaled in a housing. More particularly, the invention is concerned with a seal to prevent the escape of fluids around a shaft which passes through a wall of a housing.

The invention is particularly applicable to machines such as refrigerator compressors, although, of course, it is useful in any machine having these mechanical parts. The general objects of the invention reside in the provision of a seal having a long life, and which is highly efficient. In seals of this type there is usually a surface to surface contact between a sealing member and the shaft or housing and where relative rotation occurs. When the surfaces are subjected to a corrosive fluid, a chemical problem is presented; also, mechanical problems are present in the mechanism and the efficiency of the sealing surfaces; the chemical problem, which for example may be where there is a corrosive action on the sealing surfaces, may ultimately result in mechanical trouble, or combined chemical and mechanical trouble.

In accordance with the present invention the seal is so arranged that the chemical problem is practically eliminated, and thus mechanical troubles developing therefrom are likewise eliminated; further, the seal of the present invention preferably includes double sealing agencies, with the mechanical problems practically confined to one of the agencies which is remote from and which is unaffected by any chemical action.

To these ends a structure is provided wherein the pressure on one side of the journal for the shaft, say for example, inside a crank case or housing, is utilized for creating an effect on one of the sealing agencies in such wise as to practically eliminate the possibility of a corrosive fluid attacking the sealing surface, or in other words, to minimize or practically eliminate the above mentioned chemical troubles. As will be noted as the detailed description progresses, the pressure within the crank case is not necessarily utilized to create a pressure on the sealing surfaces, but is used in another manner, which is such that the leaking tendency through one of the sealing agencies is reversed in direction relative to what the normal leaking tendency would be. These and other objects of the invention will become more fully set forth as the detailed description progresses.

Figure 1:
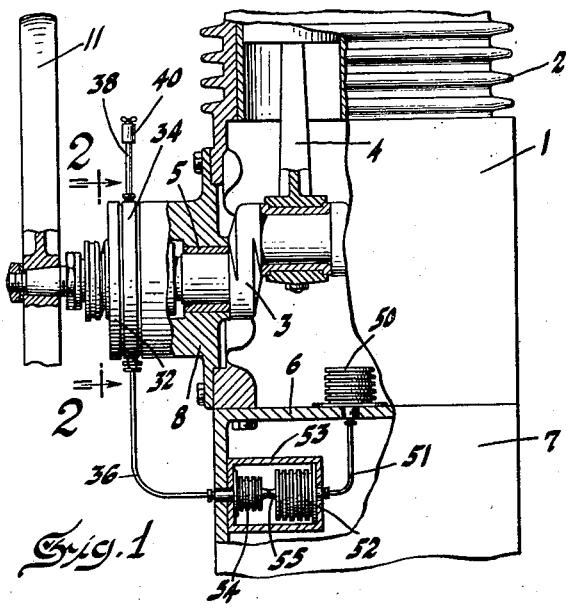
Fig. 1 is a view with parts cut away and partly in section illustrating the invention applied to a compressor.
Figure 2:
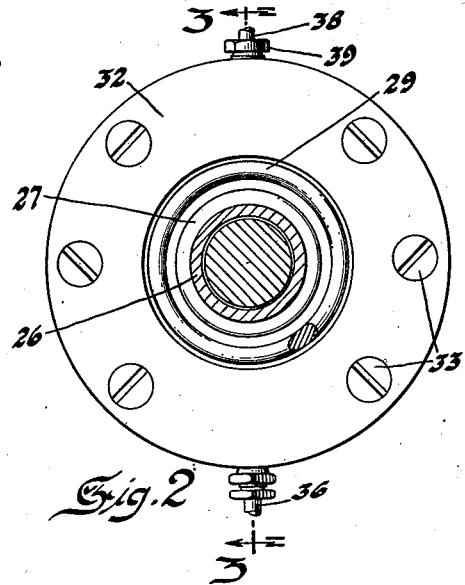
Fig. 2 is a sectional view of enlarged form taken substantially on line 2—2 of Fig. 1.

While the invention is shown in connection with a compressor for a refrigerator it is, of course, to be understood that it is applicable to other types of machines. In Fig. 1 the crank case of a compressor is illustrated at 1, a cylinder structure at 2, a crank shaft at 3, a connecting rod 4, and the crank shaft is journaled in a wall of the crank case as by means of a bearing 5. The crank case may have a lower closure partition or bottom 6 and the machine may rest upon a suitable support 7.

Figure 3:
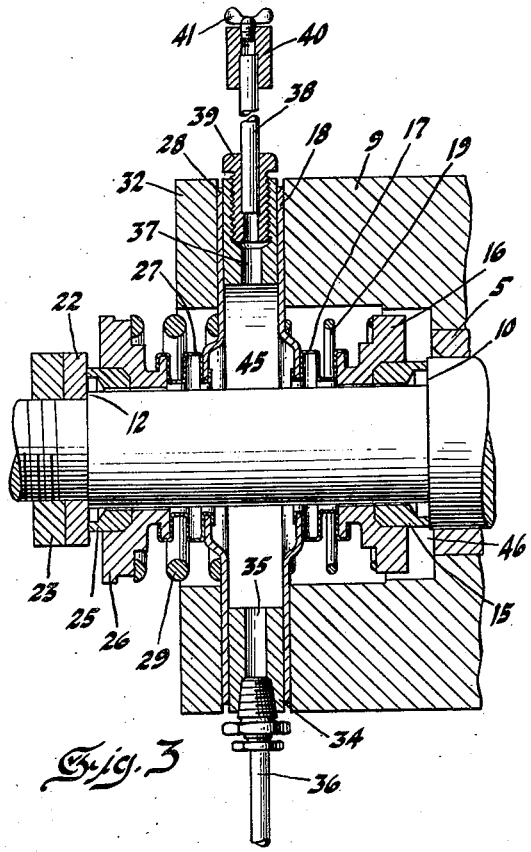
Fig. 3 is a sectional view taken through the seal structure substantially on line 3—3 of Fig. 2.

Referring to Fig. 3, it will be noted that the crank case, in the side wall where the shaft is journaled, has a member 8 secured thereto which projects in the form of a hollow boss 9. The shaft may be formed to provide a shoulder 10, and its extreme end may be arranged to carry a flywheel or pulley wheel 11. The shaft may also be formed with another shoulder 12.

The seal structure includes a sealing member 15 which may be of suitable metal or other material for the purpose of efficiently frictionally engaging the shoulder 10, and set into a holding member 16 hermetically sealed to an element preferably in the form of a cylindrical bellows capable of being collapsed or extended axially and which is shown at 17. The opposite end of the bellows is sealed to a disc 18. A coil spring which is preferably quite light in strength is shown at 19, and it lies between the disc 18 and the end member 16 and functions to hold the member 15 against the shoulder 10.

A second and similar structure is arranged in an oppositely disposed relation, for which purpose a washer 22 may be held up against the shoulder 12 by a nut 23. A sealing member 25 carried by a holding element 26 frictionally engages the washer, the holding element being hermetically sealed to a bellows 27, the opposite end of which is hermetically sealed to a disc 28, and a spring 29 lies between the disc 28 and member 26. This spring, however, is of heavier or stronger construction than the spring 19. The washer constitutes in effect a shoulder on the shaft.

The discs 18 and 28 are sealed in their outer zones to the housing. For this purpose an end plate 32 may be fastened to the extension 9 by machine screws 33 to clamp the outer portions of the disc between the plate and the tubular extension. However, interposed preferably between the two discs is a ring 34, the whole arrangement being that the joint between these parts, namely, the discs 18 and 28, the ring 34, end plate 32, and housing portion 9 is of a hermetic or fluid tight nature. This ring has an aperture 35 therethrough to which is connected a tube or pipe 36 through a suitable fitting, as shown. Although it is not entirely necessary, a gauge glass may be provided for purposes which will presently appear, and this may be also associated with the ring, for which purpose the ring may have another aperture 37 communicating with a gauge glass 38 which is secured fluid tightly therein by a suitable fitting 39. A fitting or metal piece 40 may be secured to the top of the gauge glass and it may have an opening closed by a removable plug 41. It will be understood that the gauge glass and its associated parts are fluid tight relative to each other and relative to the ring.

Accordingly, it will be noted that there is a chamber 45 established between the two sealing agencies, it being understood that the parts 15 and 16 and the parts 25 and 26 do not seal against the cylindrical surface of the shaft, and in fact are preferably spaced therefrom. Also, it will be noted that there is a chamber 46 located between the inner sealing member, that is the sealing member composed of the bellows 17 and associated parts, and the housing member 9. The member 16 preferably clears the adjacent wall portion or inner surface of the member 9.

Now going back to Fig. 1, it will be noted that there is a bellows 50 advantageously of corrugated cylindrical form located within the crank case and sealed to the bottom 6 thereof, with its upper end, which is closed, exposed inside the crank case. A tube line 51 connects into another bellows 52. The bellows 50 and 52 and the connecting tube 51 constitutes a closed system, and this system is filled with a suitable fluid, preferably a liquid. The bellows 52 may be mounted in the support or box-like member 53, and opposite the same is another bellows 54. The adjacent ends of these two bellows are closed, and they may have cooperating portions for contacting with each other, preferably centrally located on each, these portions being in the form of nibs or projections as shown at 55. The tube line 36 connects into the bellows 54, and, as above described, connects into the space 45. It will be noted that the bellows 52 and 54 back up against opposite walls of the box 53 so that they are held from moving bodily away from each other. The chamber 45, tube 36 and bellows 54 constitutes a closed fluid system and is filled with a fluid, preferably a liquid.

Figure 4:
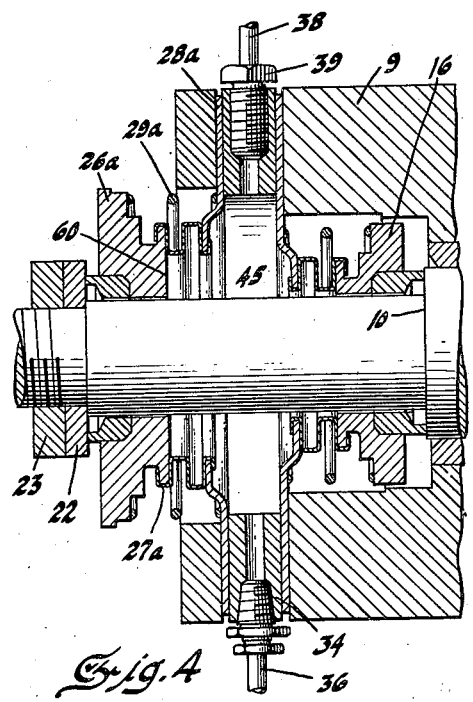
Fig. 4 is a sectional view similar to Fig. 3 showing a modified form of the invention.

Before going into the description of the operation and the results achieved, it is thought to be preferred to consider the structure of the modified form shown in Fig. 4. Most of the elements in Fig. 4 are the same as shown in Fig. 3 and on those elements which are the same, the same reference characters have been applied, thus making it unnecessary to make a possibly objectionable duplicate description. However, in this form the member 26a which corresponds to member 26 in Fig. 3 is of an increased outer diameter; the bellows 27a is similarly increased in diameter and of course the inner diameter of the disc 28a may be similarly increased in size so as to properly fit the bellows 27a. The spring 29a is of light construction or strength, as distinguished from the heavy spring 29. Save for these parts, redescribed with the reference characters identified by the letter "a", the remaining portions may be the same as that shown in Fig. 3. This arrangement provides a surface 60 on the inner face of the member 26a, the purpose of which will presently appear.

The apparatus is set up as follows: The bellows 50 and 52 and connecting pipe 51 constitute a closed system preferably filled with a liquid. The second system constituted by the bellows 54, pipe line 36, chamber 45 and, where the gauge glass is used this is included in the second system, is likewise filled with a fluid preferably an oil such as is used for lubricating purposes in the crank case.

In the operation of the compressor, it will be understood that the pressure in the crank case varies. In some installations it has been found that the pressure in the crank case varies from 130 pounds per square inch to twelve inches of vacuum. Quite obviously, when the pressure is high in the crank case there is an increased tendency for the escape of gases or liquids through the bearing 5. The tendency, however, is not so great with lighter pressure. In accordance with the present invention the sealing pressure against the shoulder 10 is preferably relatively light. This minimizes wear and mechanical difficulties. It will be appreciated that some of the refrigerant or mixed oil and refrigerant in the crank case tends to leak out through the bearing, and it is the purpose of the invention to seal this joint and prevent such leakage.

Heretofore, it has been necessary to have a high sealing pressure obtained, for example, by a strong spring or where the pressure of the member 15 against the shoulder 10 increases with an increase of pressure within the crank case. This, however, puts a greater load on the machines and tends to accentuate mechanical difficulties. Let it be assumed for the moment that the member 15 be acting as a seal, after the manner of the prior art, without the present invention associated therewith. The refrigerant leaks out through the bearing into the space 46, but there it is trapped. However, the surfaces 10 and 15 have to be lubricated and the refrigerant may get into the lubricating oil, or the oil may be a solvent for the refrigerant, with the result that some air, on the inside of the bellows 17 comes into contact with the oil containing the refrigerant. The moisture and refrigerant, as for example, when $SO_2$ is used, sets up a corrosive action on the sealing surfaces and it is but a matter of time when the sealing joint is ruined.

Reverting now to the operation of the present invention. Any pressure in the crank case tends to collapse the bellows 50 and to expand the bellows 52. The expansion of the bellows 52 tends to collapse 54, which creates a pressure in the chamber 45. Now this pressure in the chamber does not necessarily increase the pressure of member 15 against the shoulder 10, as the arrangement may be that this increased pressure is substantially balanced or not effective for urging the seal member 15 one way or the other. Accordingly, whatever pressure is in the crank case tending to cause the gases to leak out is counteracted by the pressure in the chamber 45. The leaking gases may tend to flow through the sealed joint radially inwardly, while the counteracting pressure tends to cause the oil to flow through the sealing joint radially outwardly.

The preferred arrangement is to provide a pressure in the chamber 45 which will be slightly greater than that in the crank case. This is done by using a bellows 52 somewhat larger than the bellows 54, as indicated in Fig. 1. One example which has been found satisfactory is where the relationship of the effective area of these two bellows is about 10 to 9 respectively. This is sufficient to overcome pressure loss, due to friction, or line loss and still have the pressure in the chamber 45 slightly greater than that in the crank case and the chamber 46. Accordingly, there is a tendency for the liquid in the chamber 45 to flow past the sealing joint between parts 10 and 15 through the bearing into the crank case, which is just the reverse to what it would be if there was leakage from the crank case. If oil is used like that used for lubricating purposes in the crank case, just a small amount of such oil may escape into the crank case, but it is so small that it makes no practical difference. All the while the pressure against the shoulder 10 is very light and is not increased as the pressure in the crank case increases, and in one satisfactory arrangement, spring 19 had a pressure of about 5 pounds, whereas the spring 29 exerted a pressure of about 60 pounds.

Accordingly, the refrigerant or any other corrosive substance is maintained out of contact with the sealing joint 10—15, and the joint is lubricated by the oil. Thus, any corrosive or so-called chemical action on the seal surface is eliminated, and due to the adequate lubrication of the surfaces and the light spring, mechanical difficulties are practically eliminated.

The outer seal, namely, the seal between the parts 22 and 25, is of course to close the chamber 45, and there will be no chemical difficulties in this seal. Whatever troubles may exist in the outer seal will be mechanical only, and the outer seal is readily accessible should it need attention, repair or replacement.

Due to the fact that there may be some slight leakage of the liquid from the chamber 45 into the crank case, or through the outer seal 22—25, the liquid in the second system may gradually be decreased in volume. This will show up on the gauge glass 38 when the pressure in the crank case is low, as the bellows 54 is arranged to follow the bellows 52, when the bellows 52 partially collapses. At this time the plug 41 may be removed and the system filled. However, this may occur only at long intervals.

In the modified form shown in Fig. 4 the pressure on the outer seal varies with the pressure in the closed system and the crank case. Accordingly, the spring 29a may be very light merely to insure sealing arrangement at all times. As the pressure in the chamber 45 increases it acts upon the surface 60 and increases the pressure between the sealing surfaces of the members 25 and 22. With this arrangement the heavy sealing pressure is only existent when needed by the high crank case pressure and is light when only light pressure is needed. This decreases the load and is advantageous from the standpoint of minimizing mechanical troubles with the outside seal.

It will be noted that it has been stated that pressure in the chamber 45 slightly exceeds that in the crank case so as to result in a leakage tendency through the seal from the outside to the inside, relative to the crank case, rather than reversely. However, it is within the invention to have these pressures substantially balanced so that there is no particular tendency to leak one way or the other.

Where sub-atmospheric pressures in the crank case are to be encountered, the box 53 should be sealed with a partial vacuum therein, preferably slightly greater than what will be encountered in a crank case. Otherwise, the atmospheric pressure on the large head of the bellows 52 will tend to collapse the bellows 52 and extend the bellows 50. However, with the vacuum in the box 53 greater than what will be experienced in the crank case, there will be, in effect, a pressure, although it may be sub-atmospheric tending to collapse the bellows 50 and acting to extend the bellows 52.

I claim:

1. In combination with a housing member, a rotary shaft member extending through the housing member, a pair of opposed sealing devices positioned to form a chamber therebetween, each having a non-rotatable fluid tight connection with one member, and a frictional surface to surface sealing engagement with the other member, and with the other member rotatable relative thereto, one of said sealing engagements being substantially exposed to the pressure within the housing and on the side thereof outside the chamber, the other of said sealing engagements serving to close said chamber, an expansible and contractible element having a fluid tight connection with the chamber, and said chamber and element being substantially filled with liquid and forming a closed system, another closed system comprising two expansible and contractible liquid containing elements, one of which is within the housing and the other of which is operatively associated with the expansible element of the first mentioned system, whereby to transmit pressure within the housing to the chamber.

2. In combination with a housing member, a rotary shaft member extending through the housing member, a pair of opposed sealing devices positioned to form a chamber therebetween, each having a non-rotatable fluid tight connection with one member, and a frictional surface to surface sealing engagement with the other member, with the other member rotatable relative thereto, one of said sealing engagements being substantially exposed to the pressure within the housing and on the side thereof outside the chamber, the other of said sealing engagements serving to close said chamber, a bellows connected to the chamber and forming therewith a closed system substantially filled with liquid, a second bellows within the housing, a third bellows in liquid connection therewith and forming a second closed system substantially filled with liquid, said third bellows being in operative relation with the first mentioned bellows and having a greater effective diameter whereby to transmit the pressure in the housing in increased manner to the chamber.

3. In combination with a crank case or the like, a rotary shaft extending through a wall of the crank case, a shoulder on the shaft, a sealing element having a fluid tight joint with the housing, and having a sealing member frictionally engaging the shoulder, relatively light spring means for maintaining the sealing element in engagement with the shoulder, the outside of said sealing element being substantially exposed to the pressure in the crank case, another sealing element having a fluid tight engagement with the housing, another shoulder on the shaft, said other sealing element having the sealing member in frictional engagement with said other shoulder, spring means for holding said other sealing element in engagement with said other shoulder, said sealing elements being arranged to provide a chamber therebetween closed by said sealing members, a bellows in fluid tight connection with the chamber, said bellows and chamber being substantially filled with liquid, a second bellows operatively associated with the first bellows and arranged to expand and contract in accordance with the variations in the pressure in the crank case whereby to transmit said pressure to said chamber.

4. In combination with a crank case or the like, a rotary shaft extending through a wall of the crank case, a shoulder on the shaft, a sealing element having a fluid tight joint with the housing, and having a sealing member frictionally engaging the shoulder, relatively light spring means for maintaining the sealing element in engagement with the shoulder, the outside of said sealing element being substantially exposed to the pressure within the crank case, another sealing element having a fluid tight engagement with the housing, another shoulder on the shaft, said other sealing element having a sealing member in frictional engagement with said other shoulder, spring means for holding said other sealing element in engagement with said other shoulder, said sealing elements being arranged to provide a chamber therebetween closed by said sealing members, a bellows in fluid tight connection with the chamber, said bellows and chamber being substantially filled with liquid, a second bellows operatively associated with the first bellows and arranged to expand and contract in accordance with the variations in the pressure in the crank case whereby to transmit said pressure to said chamber, said second bellows having an effective diameter greater than the first whereby to increase the pressure transmitted to said chamber so that the leakage tendency is from said chamber toward the crank case.

5. In combination with a crank case and a rotary shaft extending through a wall of the crank case, said shaft having a pair of spaced shoulders, a pair of oppositely disposed sealing members each having a fluid tight connection with the crank case and each having a sealing member rotatably engaging one of said shoulders, said sealing devices arranged to provide a chamber therebetween, one of said sealing devices being substantially exposed on its outside to the pressure in the crank case, a closed bellows in fluid connection with the chamber, said chamber and said bellows being substantially filled with liquid, a closed liquid system including a closed bellows within the crank case, and another closed bellows arranged in operative relation with the first mentioned bellows, and said system being substantially filled with liquid, whereby to transmit pressure within the crank case to said chamber.

6. In combination with a crank case and a rotary shaft extending through a wall of the crank case, said shaft having a pair of spaced shoulders, a pair of oppositely disposed sealing members each having a fluid tight connection with the crank case and each having a sealing member rotatably engaging one of said shoulders, said sealing devices arranged to provide a chamber therebetween, one of said sealing devices being substantially exposed on its outside to the pressure in the crank case, a closed bellows in fluid connection with the chamber, said chamber and said bellows being substantially filled with liquid, a closed liquid system including a closed bellows within the crank case, and a third closed bellows arranged in operative relation with the first mentioned bellows, and said system being substantially filled with liquid, whereby to transmit pressure within the crank case to said chamber, said third mentioned bellows having an effective diameter greater than that of the first mentioned bellows, whereby the pressure transmitted is increased over that in the crank case.

7. In combination with a housing member, a rotary shaft member extending through the housing member, a pair of opposed sealing devices positioned to form a chamber therebetween, each having a non-rotatable fluid tight connection with one member, and a frictional surface to surface sealing engagement with the other member, with the other member rotatable relative thereto, one of said sealing engagements being substantially exposed to the pressure within the housing and on the side thereof outside the chamber, the other of said sealing engagements serving to close said chamber, a bellows connected to the chamber and forming therewith a closed system substantially filled with liquid, a second bellows within the housing, a third bellows in liquid connection therewith and forming a second closed system substantially filled with liquid, said third bellows being in operative relation with the first mentioned bellows and having a greater effective diameter whereby to transmit the pressure in the housing in increased manner to the chamber, and an enclosure for the first and third mentioned bellows sealed under partial vacuum whereby to take care of sub-atmospheric pressures in the housing.

GORDON M. EVANS.